(12) United States Patent
Cho et al.

(10) Patent No.: US 8,914,004 B2
(45) Date of Patent: Dec. 16, 2014

(54) APPARATUS AND METHOD OF SELECTING RESOURCE OF APPLICATION IN WIRELESS TERMINAL

(75) Inventors: Jae-Won Cho, Gyeonggi-do (KR); Kyoung-Yong Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 236 days.

(21) Appl. No.: 13/451,004

(22) Filed: Apr. 19, 2012

(65) Prior Publication Data

US 2012/0270586 A1    Oct. 25, 2012

Related U.S. Application Data

(60) Provisional application No. 61/477,012, filed on Apr. 19, 2011.

(30) Foreign Application Priority Data

Apr. 13, 2012  (KR) .................. 10-2012-0038311

(51) Int. Cl.
| | |
|---|---|
| *H04L 29/08* | (2006.01) |
| *H04M 3/42* | (2006.01) |
| *H04M 3/00* | (2006.01) |
| *H04M 1/00* | (2006.01) |
| *H04W 4/18* | (2009.01) |

(52) U.S. Cl.
CPC ..................... *H04W 4/18* (2013.01)
USPC ............. 455/414.4; 455/414.1; 455/418; 455/566; 379/201.05; 717/173; 717/178

(58) Field of Classification Search
USPC ............. 455/414.1–414.4, 566, 145, 158.4, 455/418–420; 709/203; 379/201.04–201.05; 717/168–178
See application file for complete search history.

(56) References Cited

U.S. PATENT DOCUMENTS

| | | | |
|---|---|---|---|
| 2003/0167334 A1* | 9/2003 | Butler | ........................... 709/227 |
| 2004/0235464 A1 | 11/2004 | Korkalo et al. | |
| 2005/0164679 A1* | 7/2005 | Beardow | ................... 455/412.1 |
| 2007/0298843 A1 | 12/2007 | Kwon | |
| 2009/0279115 A1* | 11/2009 | Martin | ......................... 358/1.13 |
| 2010/0251231 A1* | 9/2010 | Coussemaeker et al. | ..... 717/176 |
| 2011/0055355 A1 | 3/2011 | Lee et al. | |
| 2011/0167170 A1* | 7/2011 | Kovvali et al. | ................ 709/232 |

FOREIGN PATENT DOCUMENTS

| | | |
|---|---|---|
| JP | 2004350054 | 12/2004 |
| KR | 1020080000103 | 1/2008 |
| KR | 1020100059568 | 6/2010 |

* cited by examiner

*Primary Examiner* — Michael Mapa
(74) *Attorney, Agent, or Firm* — The Farrell Law Firm, P.C.

(57) ABSTRACT

An apparatus and a method of selecting a resource of an application in a wireless terminal, which can selectively download an optimum resource of the application appropriate for the wireless terminal are provided. The apparatus includes a controller for, when a download of an application is selected, downloading an application having a resource corresponding to screen information of the wireless terminal from applications for respective resources for the application provided by an application provider.

10 Claims, 5 Drawing Sheets

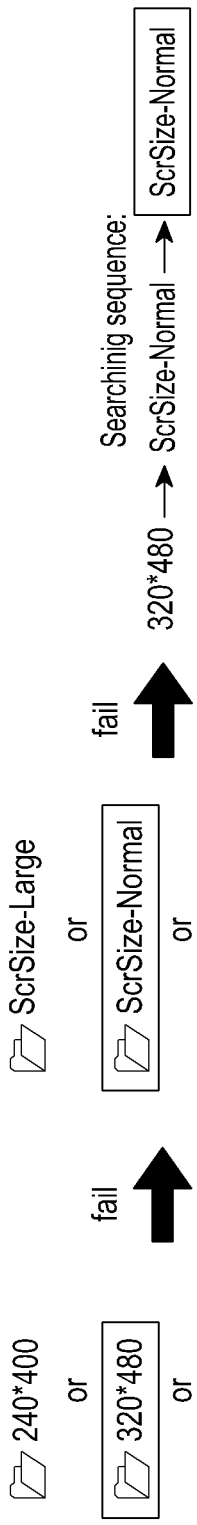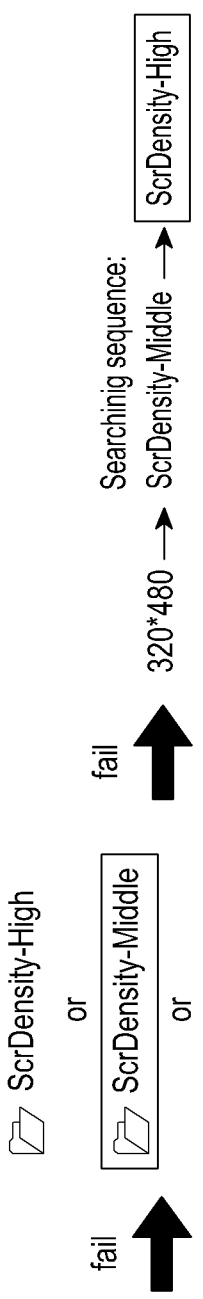
FIG.4A FIG.4B FIG.4C FIG.4D FIG.4E

APPARATUS AND METHOD OF SELECTING RESOURCE OF APPLICATION IN WIRELESS TERMINAL

PRIORITY

This application claims priority under 35 U.S.C. §119 to U.S. Provisional Patent Application Ser. No. 61/477,012, which was filed in the United States Patent and Trademark Office on Apr. 19, 2011, and Korean Patent Application, Serial No. 10-2012-0038311, which was filed in Korean Intellectual Property Office on Apr. 13, 2012, the entire disclosures of which are incorporated herein by reference.

BACKGROUND OF THE INVENTION

1. Field of the Invention

The present invention relates generally to an apparatus and a method of selecting a resource of an application in a wireless terminal, and more particularly, to an apparatus and a method of selecting a resource of an application in a wireless terminal that can selectively download an optimum resource of the application appropriate for the wireless terminal.

2. Description of the Related Art

Generally, a resource used in an application is configured for only one wireless terminal, and in the case in which it is necessary to support multiple wireless terminals, a method of preparing resources in to be used with the respective wireless terminals, coding the resources, and re-compiling the resources has been used to support multiple wireless terminals.

However, when the resources are prepared to be used with the respective wireless terminals, there is a problem in that the resources of the application should be developed taking into account screen sizes and resolutions of the respective different wireless terminal and a fragmentation phenomenon, i.e., that the application is classified for each wireless terminal due to incompatibility of binaries between the wireless terminals.

SUMMARY OF THE INVENTION

Accordingly, the present invention has been made to solve the above-stated problems occurring in the prior art, and the present invention provides an apparatus and a method of selecting a resource of an application in a wireless terminal that can selectively download an optimum resource of the application appropriate for the wireless terminal.

Further, the present invention provides an apparatus and a method of selecting a resource of an application in a wireless terminal, which can selectively download an optimum resource of the application appropriate for the wireless terminal by selecting a User Interface (UI) resource for configuring an image of an application based on the size of a screen of the wireless terminal and selecting an image source for resolution of the application based on a density of the screen of the wireless terminal.

In accordance with an aspect of the present invention, an apparatus for selecting a resource of an application in a wireless terminal is provided. The apparatus includes a controller for, when a download of an application is selected, downloading an application having a resource corresponding to screen information of the wireless terminal from applications for respective resources for the application provided by an application provider.

In accordance with another aspect of the present invention, a method of selecting a resource of an application in a wireless terminal is provided. The method includes when a download of an application is selected, receiving applications for respective resources for the application from an application provider; and selectively downloading an application having a resource corresponding to screen information of the wireless terminal from the applications for the respective resources for the application.

BRIEF DESCRIPTION OF THE DRAWINGS

The above and other aspects, features and advantages of the present invention will be more apparent from the following detailed description taken in conjunction with the accompanying drawings, in which:

FIGS. 4A to 4E illustrate the process of FIGS. 3A and 3B.

DETAILED DESCRIPTION OF EMBODIMENTS OF THE PRESENT INVENTION

Figure 1:
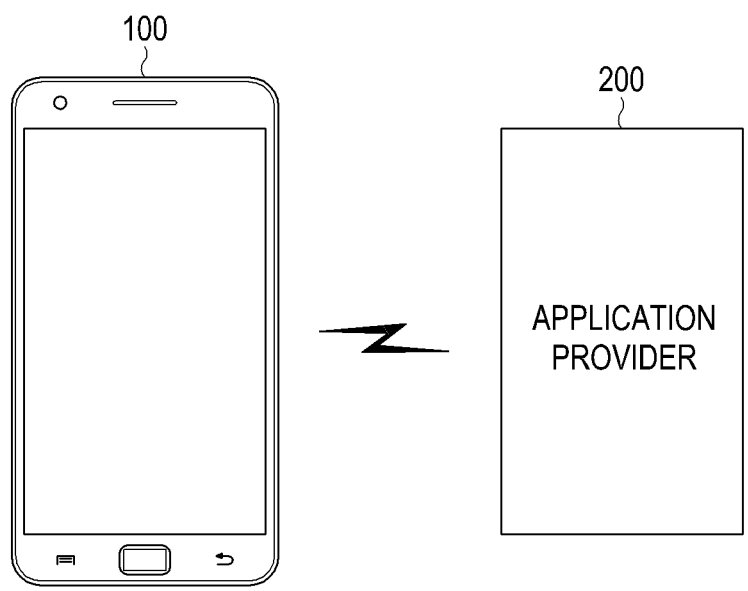
FIG. 1 illustrates a process of downloading a resource of an application in a wireless terminal.

Hereinafter, embodiments of the present invention will be described with reference to the accompanying drawings in detail. In the following description, the same elements will be designated by the same reference numerals although they are shown in different drawings.

FIG. 1 illustrates a process of downloading a resource of an application in a wireless terminal.

Referring to FIG. 1, an application provider 200 stores various applications and resources of the respective applications according to screen size and/or screen density for each application.

Accordingly, when the download of a specific application is selected in the wireless terminal 100, the application provider 200 provides the wireless terminal 100 with UI resources for configuration of a screen of the application according to the screen size and image resources for a resolution of the application according to the screen density.

Further, when the application provider 200 provides the wireless terminal 100 with the resources of the specific application according to the screen size and/or the screen density for the specific application, the application provider 200 provides a basically set screen size and/or screen density among the screen size and/or the screen density.

Further, when the download of the specific application is selected in the wireless terminal, the application provider 200 provides resolutions.

When the wireless terminal 100 accesses the application provider 200 and selects the download of the specific application, the wireless terminal 100 selectively downloads an application having a resource corresponding to screen information of the wireless terminal from the applications for each resource for the specific application provided by the application provider 200.

The wireless terminal will be described with reference to FIG. 2 in detail.

Figure 2:
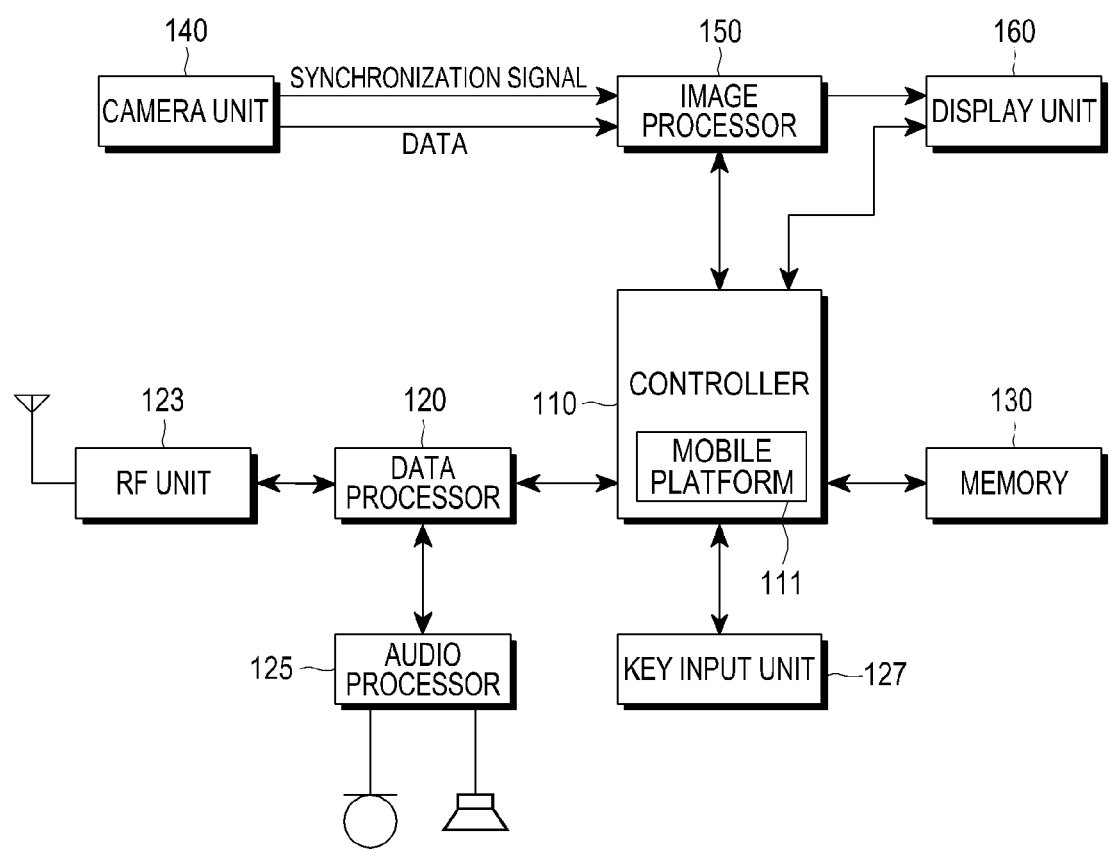
FIG. 2 illustrates a wireless terminal according to an embodiment of the present invention.

FIG. 2 illustrates the wireless terminal according to the embodiment of the present invention.

Referring to FIG. 2, a Radio-Frequency (RF) unit 123 performs the wireless communication function of the portable terminal. The RF unit 123 includes an RF transmitter for up-converting and amplifying a frequency of a transmitted signal and an RF receiver for low-noise amplifying a received signal and down-converting a frequency. A data processor 120 includes a transmitter for encoding and modulating the transmitted signal and a receiver for demodulating and decoding the received signal. That is, the data processor 120 includes a modem and a codec. Here, the codec includes a data codec for processing packet data, and the like, and an audio codec for processing an audio signal, such as voice. An audio processor 125 reproduces a received audio signal output from the audio codec of the data processor 120 or transmits a transmitted audio signal generated from a microphone to the audio codec of the data processor 120.

A key input unit 127 includes keys for inputting number and character information and function keys for setting various functions.

A memory 130 includes a program memory and a data memory. The program memory stores programs for controlling the general operation of the wireless terminal and programs such that an application having a resource appropriate for screen information of the wireless terminal is selectively downloaded according to the embodiment of the present invention. Further, the data memory temporarily stores data generated during program execution.

Further, the memory 130 stores a screen size, a screen density, and resolution as screen information of the wireless terminal.

A controller 110 controls the general operation of the wireless terminal.

According to an embodiment of the present invention, when the wireless terminal accesses the application provider 200 and selects the download of a specific application, the controller 110 controls such that an application having a resource corresponding to the screen information of the wireless terminal among the applications for respective resources for the specific application provided by the application provider 200 is selectively downloaded.

When the wireless terminal selects the download of the specific application, the controller 110 controls such that it is determined if a resolution exists corresponding to the resolution of the wireless terminal among resolutions provided by the application provider 200 and an application having a resolution corresponding to that of the wireless terminal is downloaded when there is a resolution corresponding to the resolution of the wireless terminal.

Further, when there is no resolution corresponding to the resolution of the wireless terminal, the controller 110 determines if there exists a screen size corresponding to the screen size of the wireless terminal among types of screen sizes provided by the application provider 200, and the screen size corresponding to that of the wireless terminal among the types of screen sizes provided by the application provider 200 as a UI resource for configuring the screen of the application when there exists the screen size corresponding to the screen size of the wireless terminal.

Further, according to the embodiment of the present invention, when there does not exist the screen size corresponding to the screen size of the wireless terminal, the controller 110 controls such that a basically set screen size among the screen sizes provided by the application provider 200 is set as the UI resource for the resolution of the application.

Further, when there no resolution corresponding to the resolution of the wireless terminal, the controller 110 determines if there is a screen density corresponding to the screen density of the wireless terminal among screen densities provided by the application provider 200, and the screen density corresponding to the screen density of the wireless terminal among screen densities provided by the application provider 200 is set as an image resource for configuration of the screen of the application.

Further, when there is no screen density corresponding to the screen density of the wireless terminal, the controller 110 controls such that a basically set screen density among the screen densities provided by the application provider 200 is set as the image resource.

Further, the controller 110 controls such that an application having the UI resource of the set screen size and the image resource of the set screen density is downloaded.

Further, the controller 110 includes a mobile platform 111, which performs an operation of selectively downloading the application with a resource corresponding to the screen information of the wireless terminal when the wireless terminal downloads the specific application.

A camera unit 140 photographs image data, and includes a camera sensor for converting a photographed optical signal to an electrical signal and a signal processor for converting an analog image signal photographed by the camera sensor to digital data. It is assumed that the camera sensor is a Charge Coupled Device (CCD) sensor or a Complementary Metal-Oxide-Semiconductor (CMOS) sensor, and the signal processor is a Digital Signal Processor (DSP). Further, the camera sensor is integrally formed with or independently formed from the signal processor.

An image processor 150 performs an Image Signal Processing (ISP) for displaying an image signal output from the camera unit 140 on the display unit 160, and the ISP performs functions including gamma correction, interpolation, spatial change, image effect, image scale, Auto White Balance (AWB), Auto Exposure (AE), Auto Focus (AF), and the like. Accordingly, the image processor 150 processes the image signal output from the camera unit 140 in the unit of frames and outputs image data in the unit of frames in accordance with a property and a size of the display unit 160. Further, the image processor 150 includes an image codec and compresses the image data in the unit of frames displayed on the display unit 160 according to a determined scheme or reconstructing the compressed image data in the unit of frames into an original image data in the unit of frames. The image codec includes a Joint Photographic Experts Group (JPEG) codec, Motion Picture Experts Group 4 (MPEG4) codec, a Wavelet codec, and the like. It is assumed that the image processor 150 has an On Screen Display (OSD) function, and the image processor 150 outputs OSD data in accordance with a size of a displayed screen under the control of the controller 110.

The display unit 160 displays an image signal output from the image processor 150 on a screen and user data output from the controller 110. The display unit 160 may employ a Liquid Crystal Display (LCD), and the display unit 160 may include an LCD controller, a memory for storing image data, and an LCD diode. When the LCD includes a touchscreen scheme, the LCD may function as an input unit. The display unit 160 displays keys like the key input unit 127.

The aforementioned operation of selectively downloading the application in the wireless terminal will be described with reference to FIGS. 3 and 4 in detail.

Figure 3A:
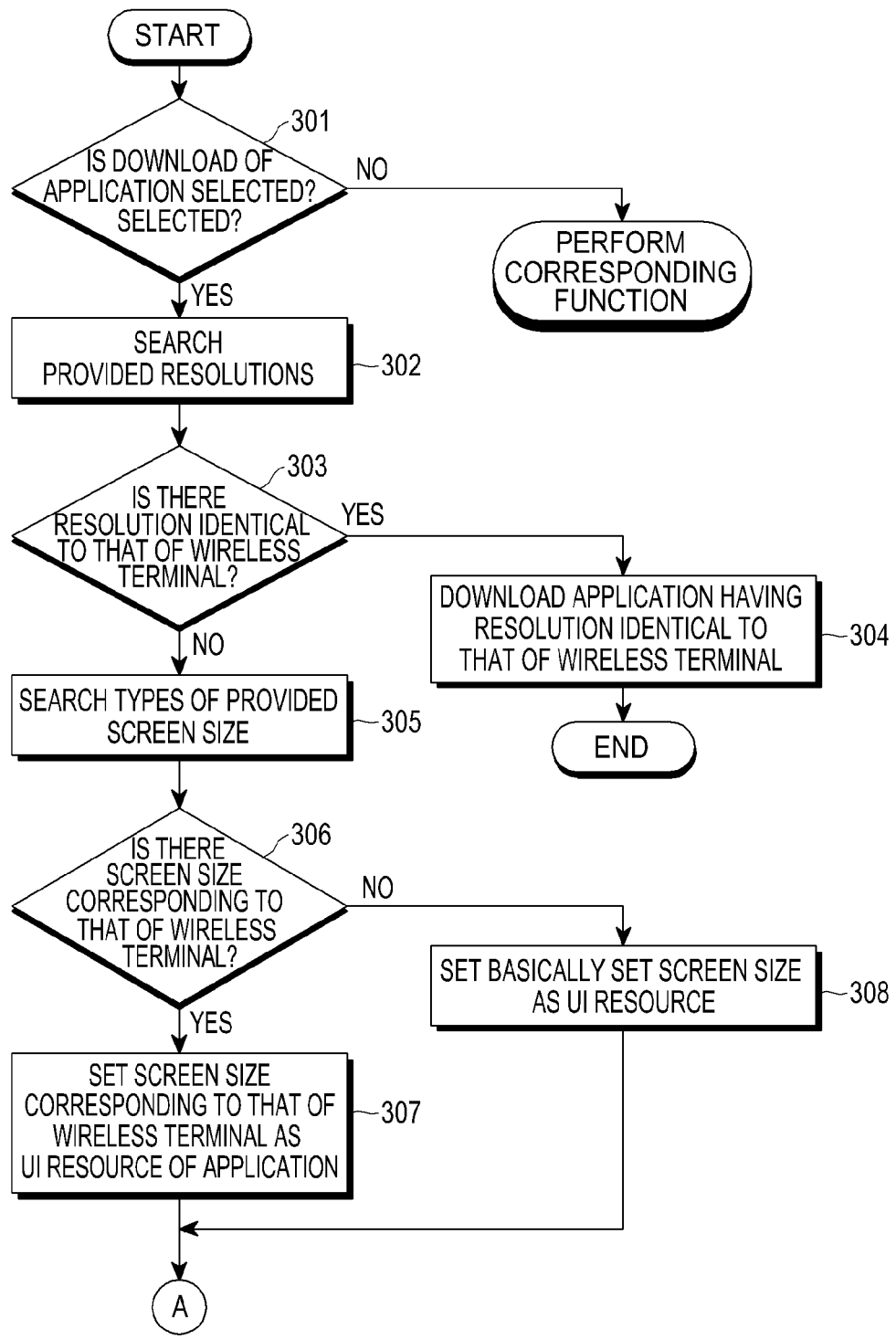
FIGS. 3A and 3B are flowcharts illustrating a process of downloading a resource of an application in a wireless terminal according to an embodiment of the present invention.
Figure 3B:
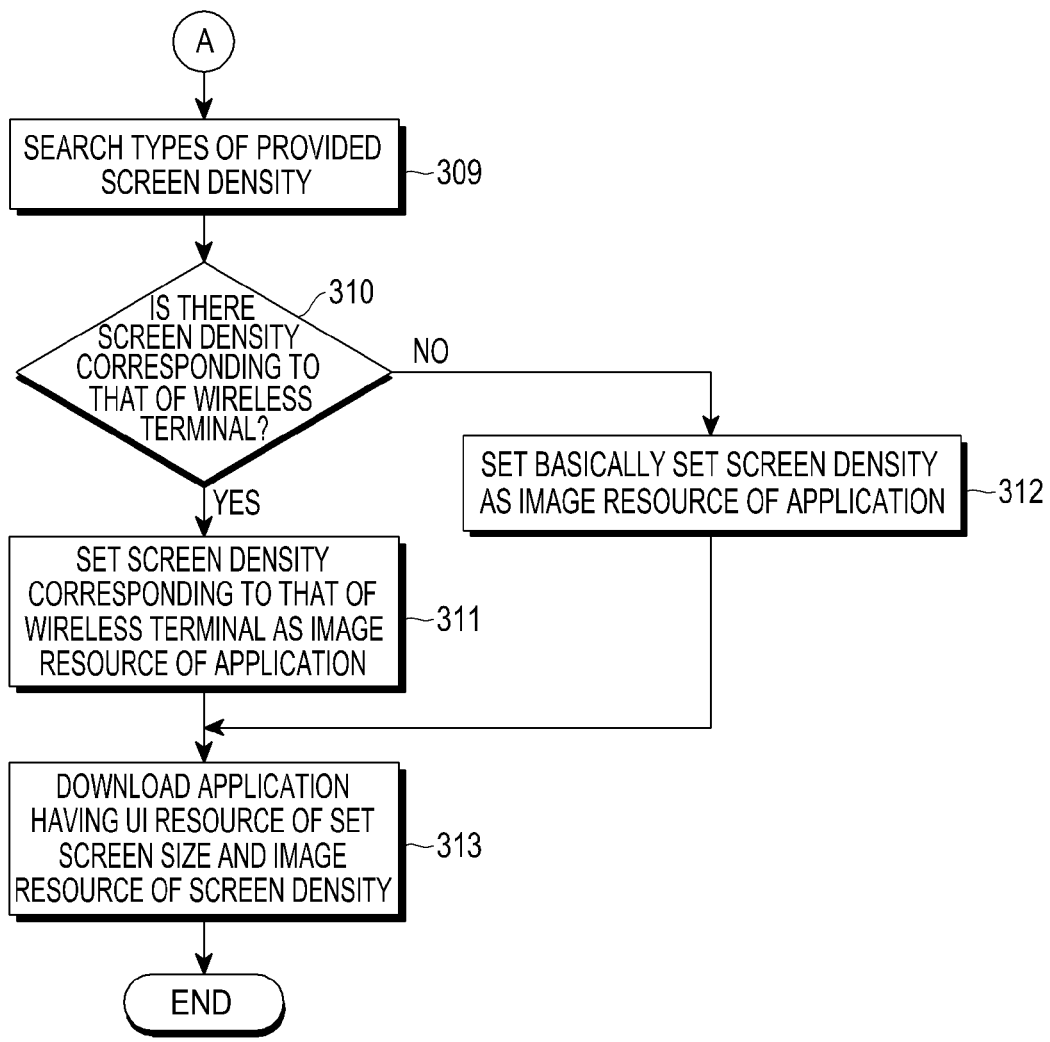

FIGS. 3A and 3B are flowcharts illustrating a process of downloading a resource of an application in a wireless terminal according to an embodiment of the present invention, and FIGS. 4A to 4E illustrate the process of FIGS. 3A and 3B.

Hereinafter, the embodiment of the present invention will be described with reference to FIGS. 3 and 4 together with FIGS. 1 and 2 in detail.

Referring to FIGS. 3A and 3B, when the wireless terminal 100 accesses the application provider 200 and selects the download of a specific application, the controller 110 detects the selection of the download of the specific application in step 301 and proceeds to step 302 of searching provided resolutions by the application provider 200.

When there is a resolution which the same as a resolution of the wireless terminal in the resolutions provided by the application provider 200, the controller 100 detects whether there is a resolution which the same as the resolution of the wireless terminal resolutions provided by the application provider 200 in step 303 and proceeds to step 304 of downloading an application having the same resolution as that of the wireless terminal.

However, when there is no resolution that is the same as the resolution of the wireless terminal among resolutions provided by the application provider 200, the controller 100 proceeds to step 305 and searches screen sizes for the specific application.

The controller 110 determines if there is a screen size corresponding to a screen size of the wireless terminal among the screen sizes of the specific application provided by the application provider 200.

When there is a screen size corresponding to the screen size of the wireless terminal in the screen sizes of the specific application, the controller 110 detects the existence of the screen size corresponding to the screen size of the wireless terminal among the screen sizes of the specific application and proceeds to step 307 of setting the screen size corresponding to the screen size of the wireless terminal among the screen sizes of the specific application as a UI resource of the specific application.

However, when there is no screen size corresponding to the screen size of the wireless terminal among the screen sizes of the specific application, the controller 110 detects the lack of screen size corresponding to the screen size of the wireless terminal among the screen sizes of the specific application and proceeds to step 308 of setting a basically set screen size among the screen sizes of the specific application as the UI resource of the specific application.

When the UI resource is set, the controller 110 proceeds to step 309 of searching screen density for the specific application provided by the application provider 200.

The controller 110 determines if there is a screen density corresponding to a screen density of the wireless terminal among the screen densities of the specific application provided by the application provider 200.

When there is a screen density corresponding to the screen density of the wireless terminal among the screen densities for the specific application, the controller 110 detects whether there is screen density corresponding to the screen density of the wireless terminal among the screen densities for the specific application in step 310 and proceeds to step 311 of setting the screen density corresponding to the screen density of the wireless terminal among the screen densities of the specific application as an image resource of the specific application.

However, when there is no screen density corresponding to the screen density of the wireless terminal among the screen densities of the specific application, the controller 110 detects the existence of the screen density corresponding to the screen density of the wireless terminal among the screen densities of the specific application in step 310 and proceeds to step 312 of setting a basically set screen density among the screen densities for the specific application as the image resource of the specific application.

When the image resource is set, the controller 110 proceeds to step 313 of downloading the set UI resource and the application having the set image resource from the application provider 200.

The embodiment of the present invention has been described based on the example of the setting of the image resource after the setting of the UI resource, but the UI resource may be set after the setting of the image resource.

Referring to FIGS. 4A to 4E illustrating the process of FIGS. 3A and 3B, it is assumed that resolutions, screen sizes, and the screen densities provided from the application provider are the following, and "ScreenSize-Normal" is the basically set screen size and "ScreenDensity-High" is the basically set screen density.

<Resolution>
480*800
320*480
240*400,
<Screen Size>
ScreenSize-Small (LCD<3.0")
ScreenSize-Normal (3.0"<LCD<405")
ScreenSize-Large (LCD≥4.5")
<Screen Density>
ScreenDensity-High (110≤dpi<150)
ScreenDensity-Middle (150≤dpi<220)
ScreenDensity-Low (220≤dpi<290)

When the resolution in the screen information of the wireless terminal selecting the download of the specific application A is 320×480, the controller 110 of the wireless terminal selects the resolution 320×480 from resolutions provided by the application provider 200 and downloads the specific application A having the resolution 320×480 from the application provider 200, as illustrated in FIG. 4A.

However, when the resolution and the screen size in the screen information of the wireless terminal selecting the download of the specific application A are 320×400 and 3.14 inch, respectively, the controller 110 of the wireless terminal selects "ScreenSize-Normal" from the types of screen sizes provided by the application provider 200 and sets "ScreenSize-Normal" as the UI resource as illustrated in FIG. 4B.

Otherwise, when the resolution and the screen size in the screen information of the wireless terminal selecting the download of the specific application A are 320×400 and 5.2 inch, respectively, i.e., the screen size of the wireless terminal is not included in the types of screen sizes provided by the application provider 200, the controller 110 of the wireless terminal selects the basically set"ScreenSize-Normal" from the types of screen sizes provided by the application provider 200 and sets "ScreenSize-Normal" as the UI resource as illustrated in FIG. 4C.

When the screen density in the screen information of the wireless terminal selecting the download of the specific application A is 158 dpi after the setting of the UI resource, the controller 110 of the wireless terminal selects "ScreenDensity-Middle" from the screen density provided by the application provider 200 and sets "ScreenDensity-Middle" as the image resource as illustrated in FIG. 4D.

Otherwise, when the screen density in the screen information of the wireless terminal selecting the download of the specific application A is 350 dpi after the setting of the UI resource, i.e., the screen density of the wireless terminal is not included in the screen densities provided by the application provider 200, the controller 110 of the wireless terminal selects "ScreenDensity-High" among the screen densities provided by the application provider 200 and sets "ScreenDensity-High" as the image resource as illustrated in FIG. 4E.

When the image resource is set, the controller 110 downloads the specific application A having the screen size ("ScreenSize-Normal") set as the UI resource and the screen density ("ScreenDensity-Middle" or "ScreenSize-High") set as the image resource.

It will be appreciated that the method of downloading the application having the resource corresponding to the screen information of the wireless terminal according to the embodiment of the present invention may be implemented by hardware, software, or a combination of hardware and software. Such software may be stored in a volatile or non-volatile storage device including ROM regardless of whether it has a deletable function or a re-writable function, a memory, such as RAM, a memory chip, a device, or an integrated circuit, or a storage medium, such as CDs, DVDs, magnetic disks, or magnetic tapes, writable optically or magnetically and readable by a machine (e.g. a computer).

It will be understood that the apparatus and the method of selecting the resource of the application in the wireless terminal may be implemented by a computer, as well as the wireless terminal, including the controller and the memory, and the memory is one example of the machine-readable storage medium appropriate for storing a program or programs including instructions implementing the embodiments of the present invention. Accordingly, the present invention includes a program including codes for implementing the apparatus or the method defined in any one of the claims and the machine (computer, etc.) readable storage medium for storing the program. Further, the program may be electrically carried through a medium, such as a communication signal, transferred with wired or wireless connection, and the present invention appropriately includes the equivalent thereto.

Further, the method of downloading the application having the resource corresponding to the screen information of the wireless terminal according to the embodiment of the present invention may be implemented in all devices capable of downloading the application having the resource corresponding to the screen information of the wireless terminal, as well as a portable wireless terminal, a hand-held terminal, a wireless terminal, and a mobile terminal. All devices to which the present invention may be applied may receive and store the program from a wired or wirelessly connected program providing device. The program providing device includes a memory for storing a program including instructions through which a device to which the present invention may be applied can download an application having a resource corresponding to screen information, a communication unit for wired or wirelessly communicating with the device, and a controller for transmitting a request of the device or automatically transmitting a corresponding program to a transmission/reception device.

While the present invention has been shown and described with reference to certain embodiments of the wireless terminal, it will be understood by those skilled in the art that various changes in form and details may be made therein without departing from the spirit and scope of the invention. Accordingly, the scope of the present invention is not defined by the aforementioned embodiments, but by the claims and their equivalents.

What is claimed is:

1. An apparatus for selecting a resource of an application in a wireless terminal, the apparatus comprising: a controller for, when a download of a specific application is selected, downloading an application corresponding to the specific application having a resource corresponding to screen information of the wireless terminal from among applications providable by the application provider each having their own respective resources; and when the application having the resource corresponding to the screen information of the wireless terminal does not exist, downloading a basically set application among resources for the specific application provided by the application provider, wherein when the download of the specific application is selected, the controller:
determines whether there is an application corresponding to the specific application having a resolution identical to a resolution of the wireless terminal of resolutions provided by the application provider, and when there is no application providable by the application provider corresponding to the specific application having a resolution identical to the resolution of the wireless terminal, sets a screen size corresponding to a screen size of the wireless terminal from screen sizes provided by the application provider as a User Interface (UI) resource for configuring a screen of the specific application, and sets a screen density corresponding to a screen density of the wireless terminal among screen densities provided by the application provider as an image resource for a resolution of the specific application, and downloads an application corresponding to the specific application having; the UI resource corresponding to the set screen size and having the image resource corresponding to the set screen density.

2. The apparatus of claim 1, wherein the wireless terminal receives, from the application provider, when a UI resource corresponding to the screen size of the wireless terminal does not exist, a basically set screen size as the UI resource for configuring the screen of the specific application and, when an image resource corresponding to the screen density of the wireless terminal does not exist, a basically set screen density as the image resource for the resolution of the specific application.

3. The apparatus of claim 1, wherein, when there is the resolution identical to the resolution of the wireless terminal, the controller downloads the application having the resolution identical to the resolution of the wireless terminal.

4. The apparatus of claim 1, wherein when there is no resolution identical to the resolution of the wireless terminal, the controller determines if there is a screen size corresponding to the screen size of the wireless terminal from the screen sizes provided by the application provider, and a basically set screen size from the screen sizes provided by the application provider is set as the UI resource for the configuring the screen of the application when there does not exist the screen size corresponding to the screen size of the wireless terminal.

5. The apparatus of claim 1, wherein when there is no resolution identical to the resolution of the wireless terminal, the controller determines if there is a screen density corresponding to the screen density of the wireless terminal among the screen densities provided by the application provider, and a basically set screen density from the screen density provided by the application provider is set as the image resource for the resolution of the application when there is no screen density corresponding to the screen density of the wireless terminal.

6. A method of selecting a resource of an application in a wireless terminal, the method comprising: when a download of a specific application is selected, receiving applications for respective resources for the specific application from an application provider, and selectively downloading an application corresponding to the specific application having a resource corresponding to screen information of the wireless terminal from among applications providable by the application provider each having their own respective resources; and when the application having the resource corresponding to the screen information of the wireless terminal does not exist, downloading a basically set application among resources for the specific application provided by the application provider, wherein selectively downloading the application comprises: determining whether there is an application corresponding to the specific application having a resolution identical to a resolution of the wireless terminal from resolutions provided by the application provider; and when there is no application providable by the application provider corresponding to the specific application having a resolution identical to the resolution of the wireless terminal, setting a screen size corresponding to a screen size of the wireless terminal from screen sizes provided by the application provider as a User Interface (UI) resource for configuring a screen of the specific application, and setting a screen density corresponding to a screen density of the wireless terminal among screen densities provided by the application provider as an image resource for a resolution of the specific application; and downloading an application corresponding to the specific application having the UI resource corresponding to the set screen size and having the image resource corresponding to the set screen density.

7. The method of claim 6, wherein setting the screen size comprises setting, when a UI resource corresponding to the screen size of the wireless terminal does not exist a basically set screen size as the UI resource for configuring the screen of the application; and wherein setting the screen density comprises setting, when an image resource corresponding to the screen density of the wireless terminal does not exist, setting a basically set screen density as the image resource for the resolution of the application.

8. The method of claim 6, further comprising:

when there is the resolution identical to the resolution of the wireless terminal, downloading the application having the resolution identical to the resolution of the wireless terminal.

9. The method of claim 6, wherein setting the screen size as the UI resource comprises: when there is no resolution identical to the resolution of the wireless terminal, determining if there is a screen size corresponding to the screen size of the wireless terminal among the screen sizes provided by the application provider; when there is no screen size corresponding to the screen size of the wireless terminal in the screen sizes provided by the application provider, setting a basically set screen size among the screen sizes provided by the application provider as the UI resource for the configuring the screen of the application.

10. The method of claim 6, wherein setting the screen density as the image resource comprises: when there is no resolution identical to the resolution of the wireless terminal, determining if there is a screen density corresponding to the screen density of the wireless terminal from the screen densities provided by the application provider; and when there is no screen density corresponding to the screen density of the wireless terminal from the screen density provided by the application provider, setting a basically set screen density from the screen densities provided by the application provider as the image resource for the resolution of the application.

* * * * *